(12) United States Patent
Toishi

(10) Patent No.: US 7,791,779 B2
(45) Date of Patent: Sep. 7, 2010

(54) HOLOGRAM RECORDING APPARATUS, HOLOGRAM RECORDING MEDIUM AND HOLOGRAM RECORDING METHOD

(75) Inventor: Mitsuru Toishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 291 days.

(21) Appl. No.: 11/857,005

(22) Filed: Sep. 18, 2007

(65) Prior Publication Data

US 2008/0088896 A1  Apr. 17, 2008

(30) Foreign Application Priority Data

Oct. 11, 2006 (JP) .............................. 2006-277902

(51) Int. Cl.
*G03H 1/28* (2006.01)
(52) U.S. Cl. .......................... 359/24; 369/103
(58) Field of Classification Search ...................... 359/3, 359/10, 22, 24, 35; 369/103
See application file for complete search history.

(56) References Cited

U.S. PATENT DOCUMENTS

2006/0232841 A1 * 10/2006 Toishi et al. ................... 359/24

FOREIGN PATENT DOCUMENTS

| JP | 09-230777 | 9/1997 |
| JP | 2003-331464 | 11/2003 |
| JP | 2004-226821 | 8/2004 |
| JP | 2005-326710 | 11/2005 |
| JP | 2006-235422 | 9/2006 |
| JP | 2006-243241 | 9/2006 |
| JP | 2006-267554 | 10/2006 |
| JP | 2007-101939 | 4/2007 |
| JP | 2007-225656 | 9/2007 |

OTHER PUBLICATIONS

H. Horimai, "Holographic Medium ready for taking off, turning 200 gigabytes storage capacity into reality in 2006," Nikkei Electronics, Jan. 17, 2006, pp. 105-144.

* cited by examiner

*Primary Examiner*—Alessandro Amari
(74) *Attorney, Agent, or Firm*—K&L Gates LLP

(57) ABSTRACT

A hologram recording apparatus that records a hologram on a recording layer of a hologram recording medium by causing interference between signal light modulated in accordance with record data and reference light from the same light source as that of the signal light is provided. The apparatus includes: a signal light spatial light modulating section that displays a signal light pattern for causing the signal light; a reference light spatial light modulating section that displays a reference light pattern for causing the reference light; a control section that controls the form of the signal light pattern to be displayed on the signal light spatial light modulating section and the form of the reference light pattern to be displayed on the reference light spatial light modulating section and controls optical energy of the signal light and reference light; and a temperature sensor that senses the temperature of the hologram recording medium.

9 Claims, 18 Drawing Sheets

HOLOGRAM RECORDING APPARATUS, HOLOGRAM RECORDING MEDIUM AND HOLOGRAM RECORDING METHOD

CROSS REFERENCES TO RELATED APPLICATIONS

The present application claims priority to Japanese Patent Applications JP 2006-277902 filed in the Japanese Patent Office on Oct. 11, 2006, the entire contents of which being incorporated herein by reference.

BACKGROUND

The present application relates to a hologram recording apparatus, hologram recording medium and a hologram recording method.

In recent years, a holographic memory has drawn attentions, which is a recording/reconstructing apparatus that can achieve a high recording density and record/reconstruct record data in a high transfer speed. In a holographic memory, the direction of thickness of a recording medium is also used. In a recording operation, two-dimensional information is handled in one page unit, and interference fringes of reference light and signal light are formed in a hologram (diffraction grating) form to record three-dimensionally in a hologram recording medium based on the page data in accordance with record data. In a reconstructing operation, record data is reconstructed by obtaining diffracted light caused by irradiating reference light to the thus formed hologram (Refer to JP-A-2004-226821 (Patent Document 1) and Nikkei Electronics, issued on Jan. 17, 2005, Pages 106 to 114 (Non-Patent Document 1)).

The recording/reconstruction of a hologram may adopt multiple recording that records holograms in a partially overlapping manner in slightly different areas on which holograms are to be formed on a hologram recording medium. Thus, the capacity for recording record data on the hologram recording medium can be increased (refer to Non-Patent Document 1).

The use of a photopolymer has been proposed as a hologram recording medium for performing hologram recording/reconstruction. However, it is known that a photopolymer has recording and reconstructing characteristic significantly sensitive to a temperature change. More specifically, since the thermal expansion coefficient of a photopolymer is significantly high, the thermal expansion or thermal contract is caused by the change in temperature due to the difference between the temperature of the photopolymer in recording and the temperature of the photopolymer in reconstructing. Then, the diffraction gratings on the photopolymer may rotate and/or the space between diffraction gratings and the refractive index may change, which adversely affects on the recording/reconstructing characteristics. Accordingly, a reconstructing method has been proposed that changes (or compensates) the angle and wavelength of input light in reconstructing in consideration of a change (or difference) in temperature between recording and reconstructing operations.

However, it is known that the characteristic in multiplexing also changes when a temperature changes during a recording operation, in addition to the problem due to thermal expansion, for example. In particular, the diffraction efficiency is largely different in reconstructing after recording since the recording sensitivity largely differs according to the temperature in a case where holograms are formed by using a chemical reaction on a recording layer, which contains a photopolymer, of a hologram recording medium. As a result, at a low temperature, a sufficient diffraction efficiency may not be obtained. At a high temperature, the diffraction efficiency is excessively high, which consumes wasteful M-number (which will be described later). Then, sufficient diffracted light may not be obtained from holograms to be recorded in the future.

A longer period of time may be necessary for multiplexing. Recording without consideration of this point may not exhibit a good recording characteristic. In other words, holograms in a good form may not be formed on a photopolymer. For this reason, it is difficult to exhibit a good reconstructing characteristic, that is, it is difficult to obtain high quality diffracted light from recorded holograms and reconstructing record data accurately even by compensating the angle and wavelength of input light.

SUMMARY

Accordingly, it is desirable to provide a hologram recording apparatus and a hologram recording method that can record holograms in a good form in consideration in advance of the diffraction efficiency of diffracted light obtained by irradiating reference light to a hologram recording medium in reconstructing even in a case where the temperature in recording differs, that is, where the holograms have been recorded at high and low temperatures or the temperature has changed during the recording operation and further provide a hologram recording medium suitable therefor.

According to an embodiment, there is provided a hologram recording apparatus that records a hologram on a recording layer of a hologram recording medium by causing interference between signal light modulated in accordance with record data and reference light from the same light source as that of the signal light, the apparatus including a signal light spatial light modulating section that displays a signal light pattern for causing the signal light, a reference light spatial light modulating section that displays a reference light pattern for causing the reference light, a control section that controls the form of the signal light pattern to be displayed on the signal light spatial light modulating section and the form of the reference light pattern to be displayed on the reference light spatial light modulating section and controls optical energy of the signal light and reference light, and a temperature sensor that senses the temperature of the hologram recording medium, wherein the control section irradiates a predefined amount of optical energy to the hologram recording medium in accordance with the temperature of the hologram recording medium at the time of recording such that the diffraction efficiency of diffracted light caused by the irradiation of the reference light to the hologram after recording can be equal to a predetermined value.

Since the hologram recording apparatus includes a temperature sensor, the temperature of a hologram recording medium can be sensed. The control section may irradiate a predefined amount of optical energy to a hologram recording medium in accordance with the temperature of the hologram recording medium at the time of recording such that the diffraction efficiency of diffracted light caused by the irradiation of the reference light to the hologram after recording can be equal to a predetermined value.

According to another embodiment, there is provided a hologram recording medium including a recording layer on which a hologram is recorded by causing interference between signal light modulated in accordance with record data and reference light from the same light source as that of the signal light, wherein the information on recording energy for obtaining a diffraction efficiency equal to a predetermined value to the temperature of the hologram recording medium at the time of recording the hologram is recorded in a predetermined area in advance.

In the hologram recording medium, the information on recording energy for obtaining a diffraction efficiency equal to a predetermined value to the temperature of the hologram recording medium at the time of recording holograms may be recorded in a predetermined area in advance. Therefore, when a hologram recording apparatus operates based on the information on recording energy, diffracted light of a predetermined diffraction efficiency can be obtained from the hologram recording medium.

According to another embodiment, there is provided a hologram recording method that records holograms on a recording layer of a hologram recording medium by causing interference between signal light modulated in accordance with record data and reference light from the same light source as that of the signal light, the method including the steps of sensing the temperature of the hologram recording medium, and irradiating a predefined amount of the optical energy to the hologram recording medium in accordance with the temperature of the hologram recording medium at the time of recording such that the diffraction efficiency of diffracted light caused by the irradiation of the reference light to the hologram after recording can be equal to a predetermined value.

In the hologram recording method, record data is recorded by sensing the temperature of the hologram recording medium, and irradiating a predefined amount of optical energy to the hologram recording medium in accordance with the temperature of the hologram recording medium at the time of recording such that the diffraction efficiency of diffracted light caused by the irradiation of the reference light to the hologram after recording can be equal to a predetermined value. Therefore, the predetermined diffraction efficiency can be obtained at the time of reconstructing.

According to embodiments, there can be provided a hologram recording apparatus and a hologram recording method that can record holograms in a good form even in a case where the holograms have been recorded at high and low temperatures or the temperature has changed during the recording operation and further provided a hologram recording medium suitable therefor. Then, a good diffraction efficiency can be obtained in a case where record data, which is recorded by the hologram recording apparatus and the hologram recording method, is reconstructed from the hologram recording medium. Thus, accurate record data can be reconstructed.

Additional features and advantages are described herein, and will be apparent from, the following Detailed Description and the figures.

DETAILED DESCRIPTION

An embodiment of the application will be described below. An embodiment of the application is characterized in a part relating to recording in an apparatus and a part relating to recording in a method. Since the understanding of how holograms are recorded and how holograms are reconstructed is assumed in the description of embodiments, a coaxial optical system will be described first as an example regarding the optical section functioning as a main part of a hologram recording/reconstructing apparatus, and a coaxial hologram recording/reconstructing apparatus having the coaxial optical system will be briefly described. Then, characteristics of the embodiments will be described.

(Hologram Recording/Reconstructing Apparatus Applying Coaxial Optical System)

In a hologram recording/reconstructing apparatus applying a coaxial optical system (which will be called coaxial hologram recording/reconstructing apparatus), the optical system can be simplified since recording/reconstructing can be performed through one same objective lens by sharing a part of an optical path of light beams of signal light and reference light, which will be described later. Furthermore, the coaxial hologram recording/reconstructing apparatus receive attention as a future recording/reconstructing apparatus since it is more easily compatible with an optical disk such as a CD and a DVD in the past.

Figure 1:
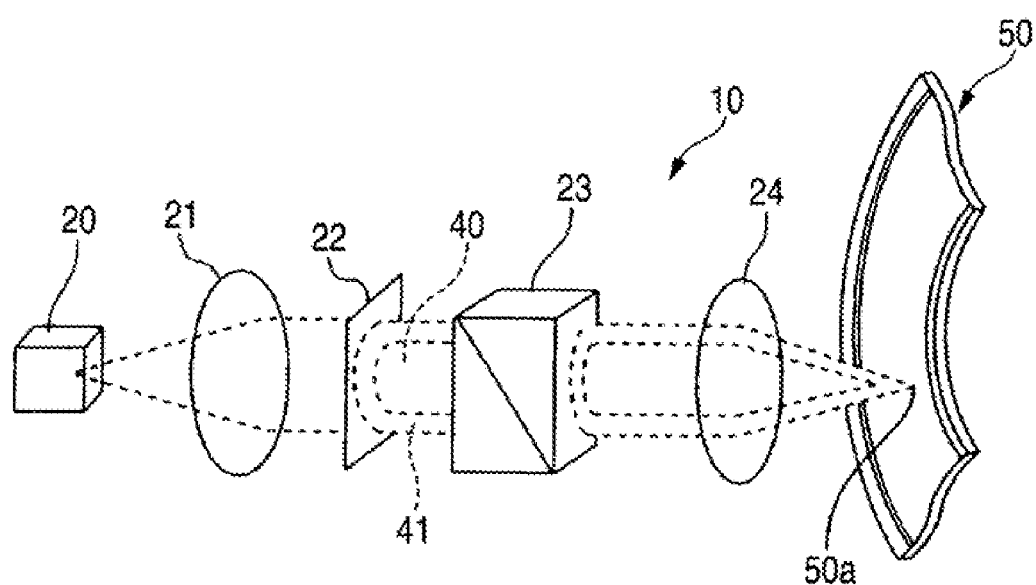
FIG. 1 is a diagram showing a concept of a coaxial optical system in a hologram recording apparatus.

FIG. 1 shows a conceptual diagram of a coaxial optical system 10 in a coaxial hologram recording apparatus. The coaxial optical system 10 includes main optical parts including a laser light source 20, a collimating lens 21, a spatial light modulator 22 having transmissive liquid crystals, a beam splitter 23, and an objective lens 24.

The light beam output from the laser light source 20 is transformed to parallel light by the collimating lens 21 and passes through the spatial light modulator 22. Then, the spatial light modulator 22 has two transparent areas for light beams including a signal light spatial light modulating section 46 (refer to FIG. 2) that displays a signal light pattern based on record data and a reference light spatial light modulating section 47 (refer to FIG. 2) that displays a reference light pattern. Light beams through the areas of the spatial light modulator 22 having the two areas passes through the common optical parts of the beam splitter 23 and objective lens 24 as signal light 40 and reference light 41 placed coaxially about one same center line. That is, the signal light 40 and reference light 41 are input to a recording layer 50a (refer to FIG. 4) of a hologram recording medium 50 through the common optical path. Then, the signal light 40 caused by the signal light spatial light modulating section 46 and the reference light 41 caused by the reference light spatial light modulating section 47 interfere in the recording layer 50a. Then, the refractive index in a minute area in the recording layer 50a varies based on the form of the interference, and record data is recorded as a diffraction grating (hologram) based on the refractive index pattern.

Figure 2:
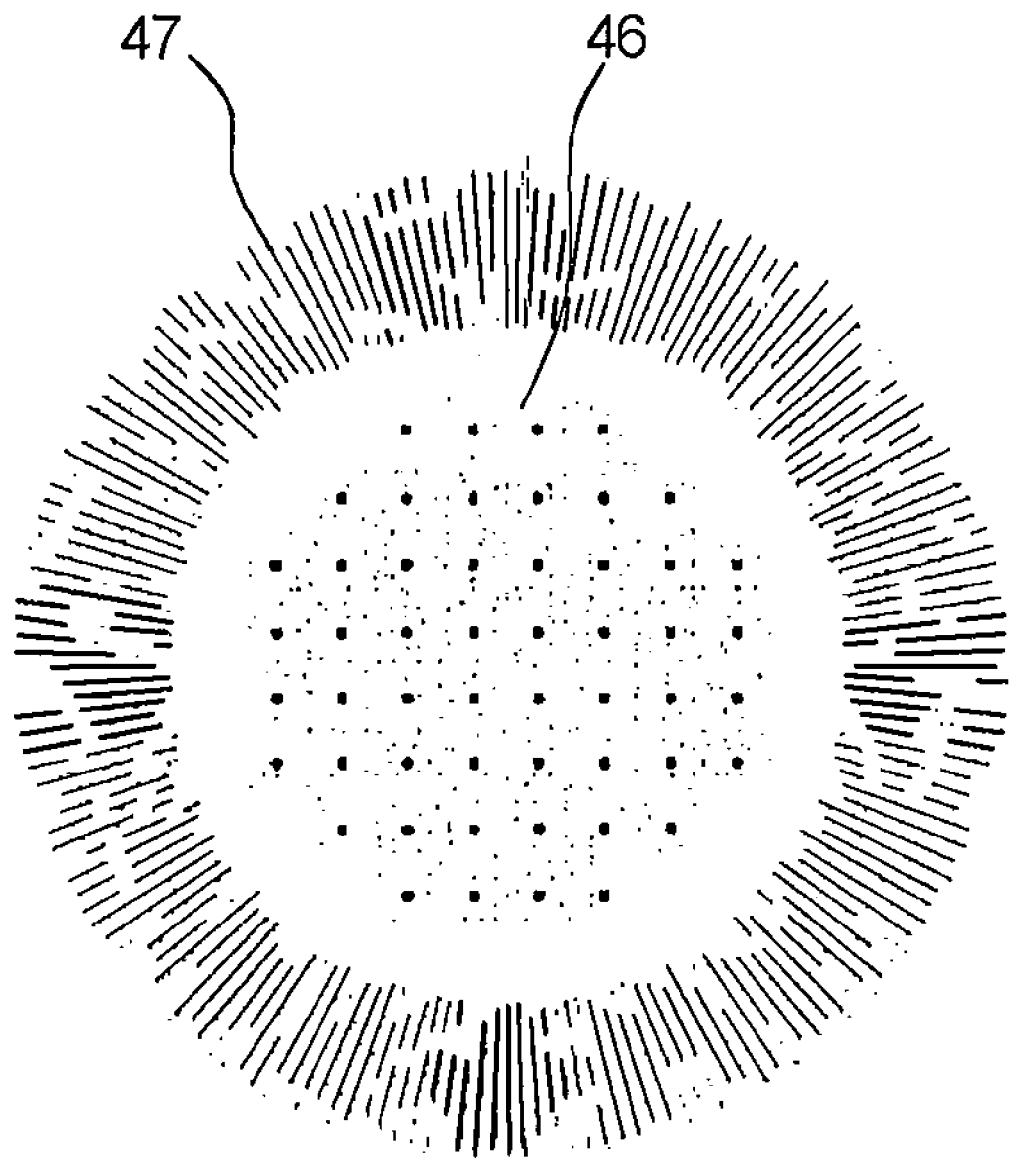
FIG. 2 shows an example of the signal light pattern and reference light pattern displayed on a spatial light modulator.

FIG. 2 shows examples of the signal light pattern and reference light pattern displayed on the spatial light modulator 22. In the patterns, the signal light pattern is displayed on the signal light spatial light modulating section 46 at a part closer to the center, and the reference light pattern is displayed on the surrounding reference light spatial light modulating section 47. In FIG. 2 for purposes of illustration, the color part (white part) is a part that shuts off light beams, and the black part on the paper is a part through which a light beam passes. In accordance with the layout of the black and white parts, the signal light and reference light vary.

The reference light pattern for record data may be not only a pattern in a spoke form (which is a form divided into the white part and the black part by lines extending concentrically) shown in FIG. 2 but also a random pattern that is a pattern having the white part and the black part spatially randomly in accordance with a random number generated in advance.

Figure 3:
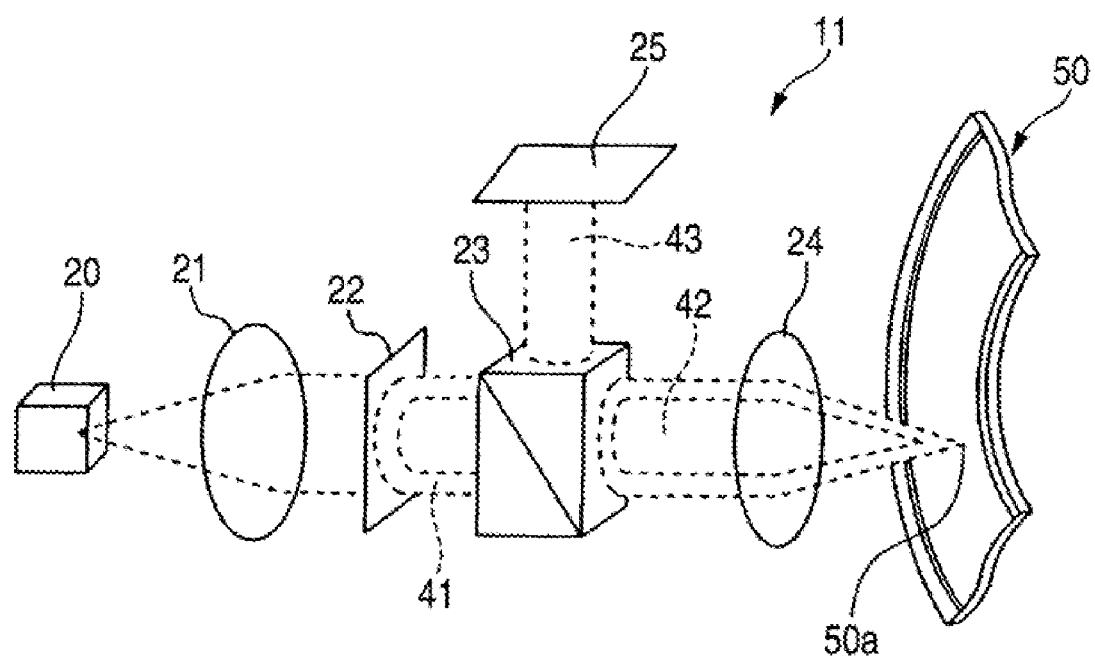
FIG. 3 is a diagram showing a concept of a coaxial optical system in a hologram reconstructing apparatus.

FIG. 3 shows a conceptual diagram of a coaxial optical system 11 for use in a coaxial hologram reconstructing apparatus. The coaxial hologram reconstructing apparatus includes an image sensor 25 including a CCD (Charge Coupled Device), for example, in addition to the laser light source 20, collimating lens 21, spatial light modulator 22, beam splitter 23 and objective lens 24 above.

In a reconstructing operation, the reference light pattern is only displayed on the reference light spatial light modulating section 47 of the spatial light modulator 22, and the signal light spatial light modulating section 46 displays a black-and-white pattern (which is a pattern in white only that blocks the transmission of light beams for purposes of illustration in FIG. 2). The reference light 41 from the reference light/spatial light modulating section 47 is allowed to pass through the beam splitter 23 and objective lens 24 and is caused to input to the hologram on the recording layer 50a of the hologram recording medium 50, whereby record data is reconstructed. Here, diffracted light 42 based on the hologram is caused by the reference light, and the diffracted light 42 is irradiated to the image sensor 25 as reconstruction light 43 by changing the direction of traveling of the diffracted light 42 as a light beam by the beam splitter 23. Then, the electric signal from the image sensor 25 is the signal based on the form of the hologram, that is, the record data. Therefore, the record data can be reconstructed from the electric signal in a readout signal processing section, not shown.

The hologram recording/reconstructing apparatus (that is an apparatus that can perform both recording and reconstructing) has the constructions of both of the coaxial optical system 10 and the coaxial optical system 11, that is, the same construction as that of the coaxial optical system 11. In recording, the spatial light modulator 22 in recording displays the signal light pattern and reference light pattern as shown in FIG. 2 on the signal light spatial light modulating section 46 and the surrounding reference light spatial light modulating section 47. In reconstructing, the reference pattern is displayed on the reference light spatial light modulating section 47, and the area corresponding to the signal light spatial light modulating section 46 can display the all black pattern that blocks light beams. Thus, the hologram recording/reconstructing apparatus can record and reconstruct. The details (form) of the display patterns in the spatial light modulator 22 are controlled by a control signal from a record signal processing section, not shown.

(Structure of Hologram Recording Medium)

Figure 4:
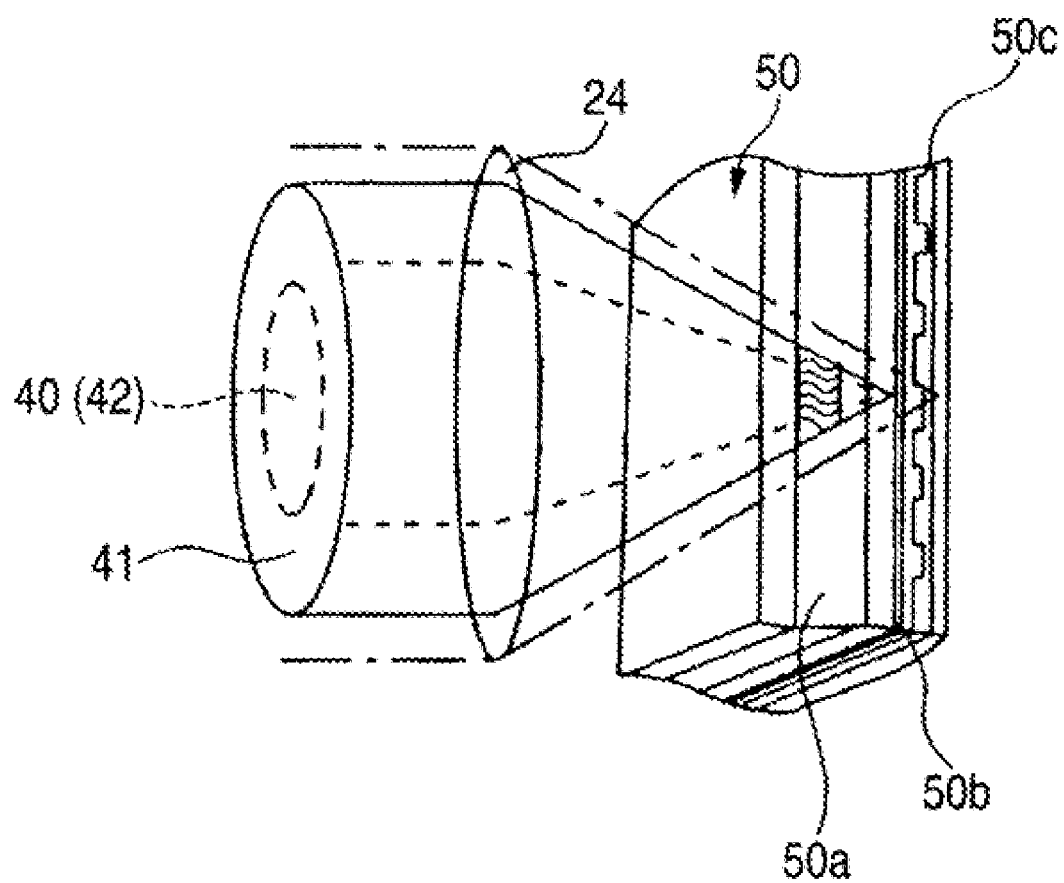
FIG. 4 schematically shows a cross-sectional structure of a hologram recording medium.

FIG. 4 schematically shows a structure of a cross-section of the hologram recording medium 50 described above and is a diagram schematically showing how the signal light 40 (which is a light beam from the spatial light modulator 22 (refer to FIG. 1) to the recording layer 50a through the inside of the broken line), the diffracted light 42 (which is a light beam from the recording layer 50a to the beam splitter 23 (refer to FIG. 3) through the inside of the broken line, like the signal line 40), the reference light 41 (which is a light beam from the spatial light modulator 22 (refer to FIG. 1) to the recording layer 50a through the space between the solid line and broken line and the light beam for servo-controlling (which is a light beam passing through the inside of the chain line) enter to the objective lens 24. The hologram recording medium 50 has the recording layer 50a, a reflective film 50b for light beams for recording/reconstructing, and address grooves 50c.

In recording, a hologram is formed in the recording layer 50a in accordance with the form of interference fringes caused by the interference between the signal light 40 and the reference light 41. In plying, due to the irradiation of the reference light 41 only to the hologram, the diffracted light 42 in accordance with the hologram is reflected by the reflective film 50b to the substantially same area as that of the signal light 40 in recording, passes through the objective lens 24 and forms the image on the image sensor 25. On the other hand, the light beam for servo-controlling passes through the reflective film 50b having a waveform selective characteristic and is reflected by an aluminum reflective film having the address grooves 50c. Under the same principle as those of a CD and a DVD, the control section can obtain an error signal for each servo necessary for focus servo, radial servo and spindle servo processing and an address signal for locating the recording layer 50a of the hologram recording medium 50 to which a light beam is to be irradiated in the hologram recording medium 50 based on the electric signal detected from a photodetector of a optical system for servo-controlling.

For example, the light beam for recording/reconstructing may be a light beam from a blue laser diode (blue light beam), and the light beam for servo-controlling may be a light beam from a red laser diode (red light beam). The mutual positional relationship between optical paths through which both of the light beams pass is specified in advance by specifying the layout of the optical parts. As a result, by performing servo-controlling by using the red light beam, the position where a hologram is to be formed by the blue beam (signal light 40 and reference light 41) can be specified by the effect of the servo. From the blue light beam (reference light 41, diffracted light 42 and reconstruction light 43), the position where record data is reconstructed from the hologram can be specified by the effect of the servo-controlling. Thus, the hologram recording/reconstructing can be performed at a predetermined position of the recording layer 50a of the hologram recording medium 50.

In the description of embodiments of the application, M/# (M number) refers to a term representing the ability of multiplexing on a hologram recording medium. M/# is an indicator of overwriting on a hologram recording medium. As the value of M/# increases, the number of overwriting stages in one area of a recording layer can increase. M/# is defined by:

$$M/\# = \Sigma (Nn)^{1/2} \quad (\text{EQ1})$$

where Nn represents a diffraction efficiency from an $n^{th}$ multiplexed hologram.

As expressed by EQ1, the diffraction efficiency does not decrease but good diffracted light can be obtained even when the number of multiplexing stages increases if any as the value of M/# increases. The value of M/# is known as being dependent on the temperature of the hologram recording medium 50 in recording. The relationship between the temperature and M/# will be described below.

Figure 5:
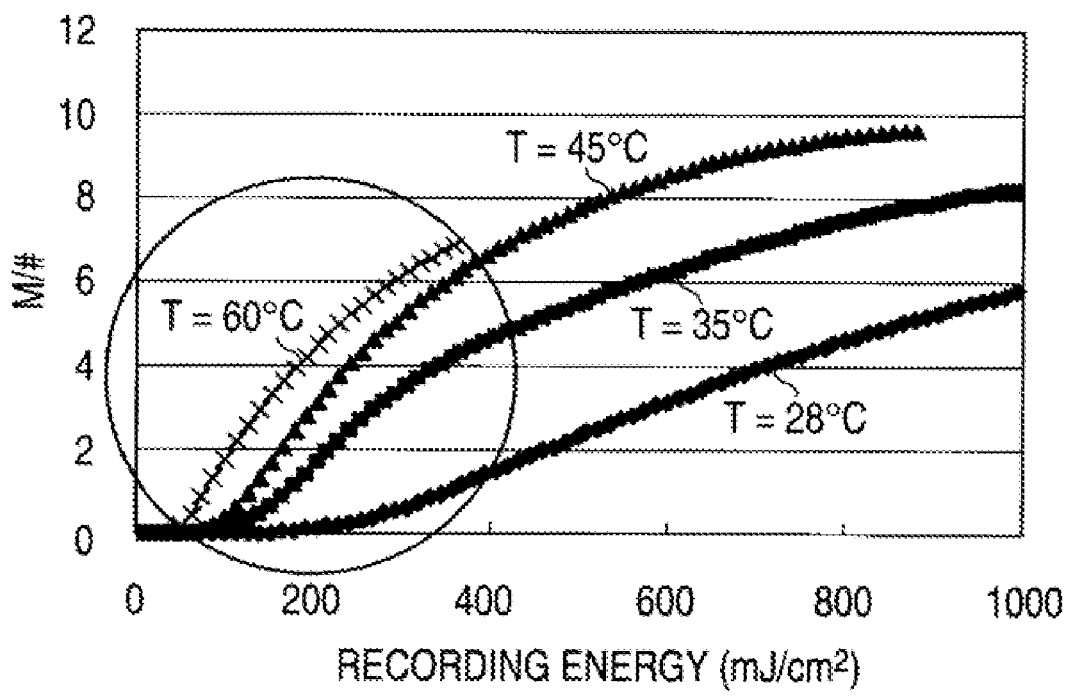
FIG. 5 is a diagram showing a characteristic of M/# to the recording energy with angle multiplexing.

FIG. 5 is a diagram showing a characteristic of M/# to recording energy (mJ/cm²) in a case where the temperatures of a hologram recording medium are 28° C., 35° C., 45° C. and 60° C. in angle multiplexing. Here, the number of multiplexing stages is 100. The recording condition is that all holograms are recorded by irradiating all light beams for one second at a same recording light intensity.

Figure 6:
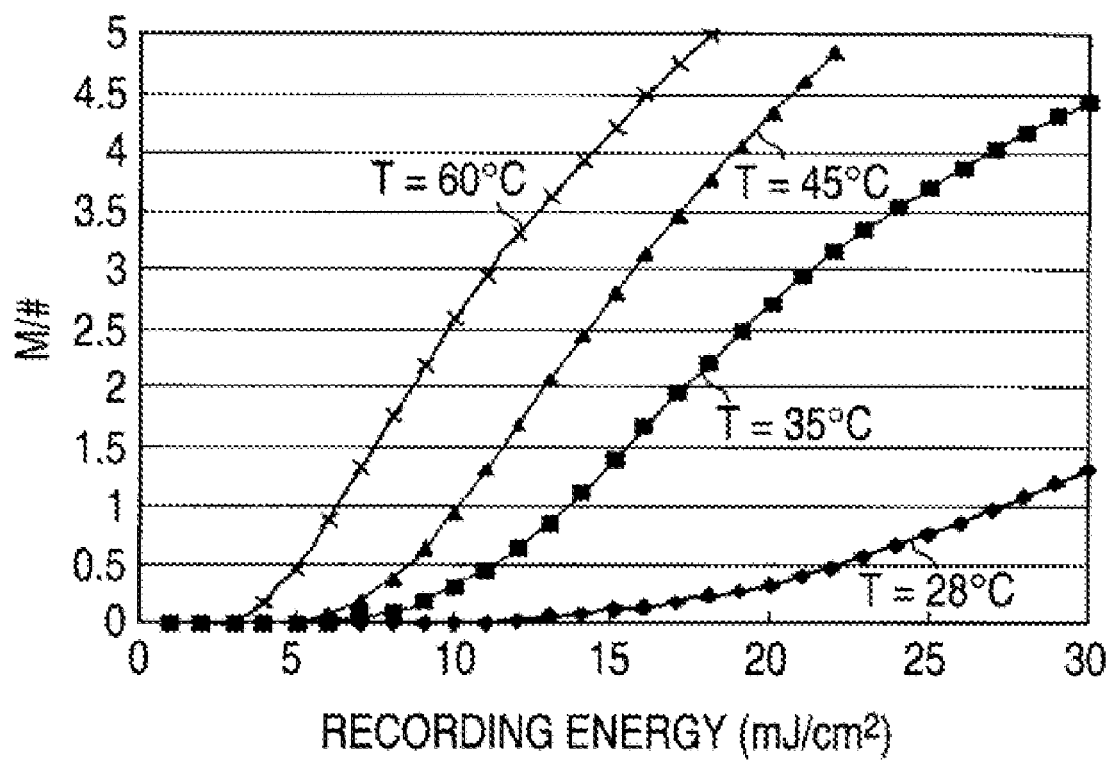
FIG. 6 is a partially enlarged view of FIG. 5.

FIG. 6 is an enlarged diagram of the part within the circle in FIG. 5 and shows a rising characteristic of M/#. Referring to the enlarged diagram shown in FIG. 6, diffracted light occurs from the third hologram at a temperature of 60° C. while no diffracted light has occurred yet even from the tenth hologram recorded at a temperature of 28° C. Here, it is assumed that the occurrence of diffracted light is determined when M/# reaches the value equal to or higher than a predetermined maximum value (such as the order of 1% of a maximum value). The reason why diffracted light does not occur from a hologram recorded first is that a radical caused by light irradiation reacts with the oxygen present within a medium and does not react with the polymerization necessary for recording. This is generally called polymerization inhibition by oxygen. The reason why diffracted light occurs by overcoming the polymerization inhibition at a high temperature may be considered as that the increase in incidence of a radical by light irradiation.

Figure 7:
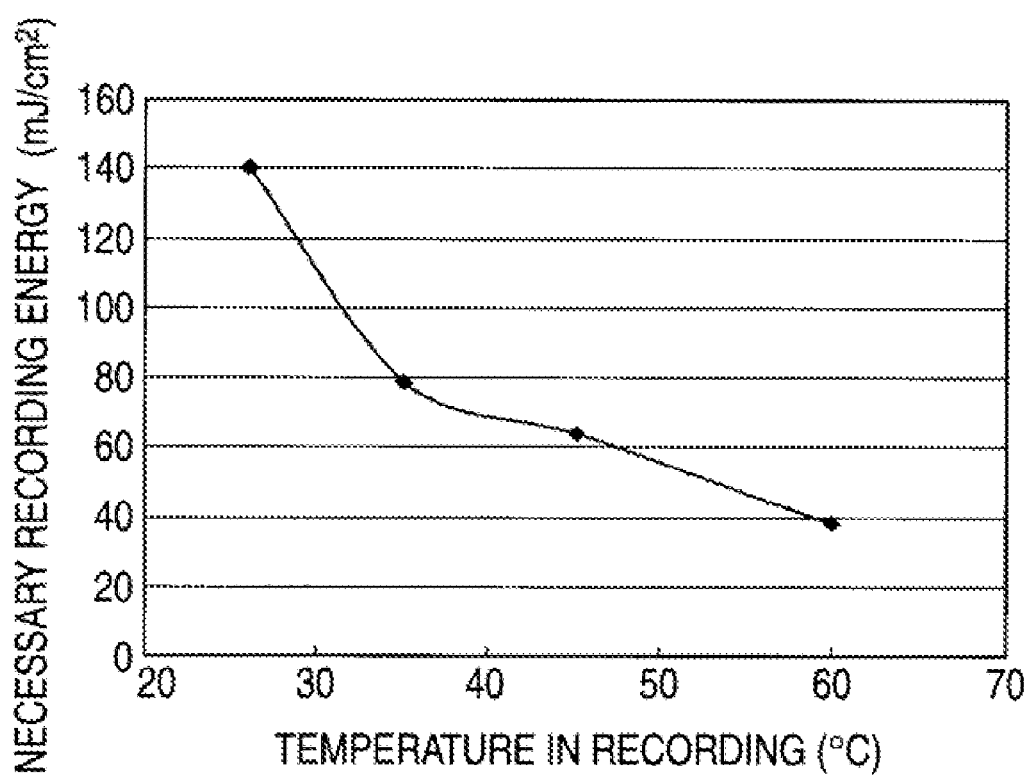
FIG. 7 is a diagram showing energy necessary for upstream processing.

In order to prevent the inhibition by oxygen, processing (upstream processing) of removing an unrecordable area by irradiating a light beam from a laser diode to a medium before recording by laser in advance. For example, using the same condition for upstream processing to recording operations on a hologram recording medium at temperatures of 28° C. and 60° C. may cause a problem that diffracted light does not occur at a temperature of 28° C. even though diffracted light occurs from a first recorded hologram at a temperature of 60° C. For reference, FIG. 7 is a graph showing energy necessary for the upstream processing on a hologram recording medium applied in this embodiment. This graph shows that the necessary upstream condition depends on the temperature.

Figure 8:
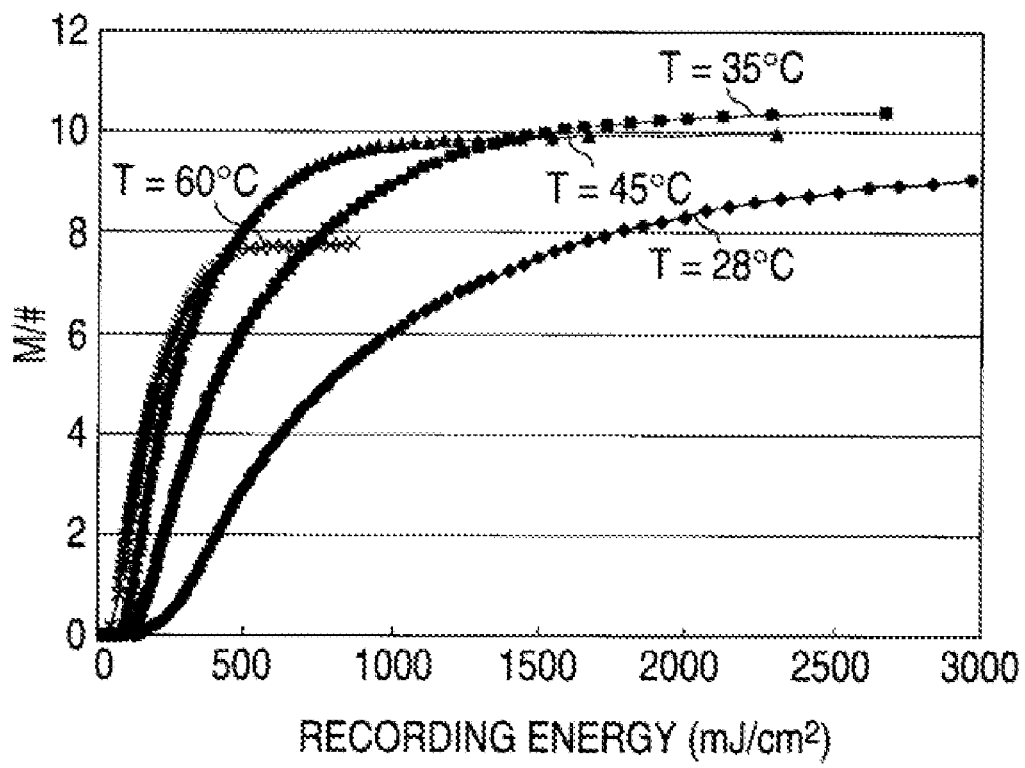
FIG. 8 is a diagram showing a characteristic of M/# with optimum scheduling in a case where the temperature in recording on a hologram recording medium takes on various values.

FIG. 8 shows a characteristic of M/# when an optimum scheduling is used in a case where the temperature in recording of a hologram recording medium takes on various values. The scheduling here includes steps of a hologram recording method for recording (that is, steps of an apparatus operation in a hologram recording apparatus), and predetermined steps are performed along the passage of a predetermined period of time. The optimum scheduling refers to the scheduling based on a certain evaluation criteria. If multiple schedules based on evaluation criterion exist, the optimum scheduling refers to the scheduling including steps determined by a maximum or minimum specific evaluation function. The optimum scheduling according to an embodiment of the application will be described in detail later. As shown in the characteristic of M/# in FIG. 8, the diffraction efficiency differs completely according to the temperature even with the same recording energy.

The medium sensitivity (in cm/mJ) of a hologram recording medium is expressed by:

$$(0.8 \times M/\#)/(I \times t \times L) \quad (\text{EQ2})$$

which will be used in the following description, where I is the light power (light intensity) of a laser in recording, t is a light beam irradiation time in recording, and L is the thickness of a recording layer of a hologram recording medium (refer to the recording layer 50a shown in FIG. 4).

Figure 9:
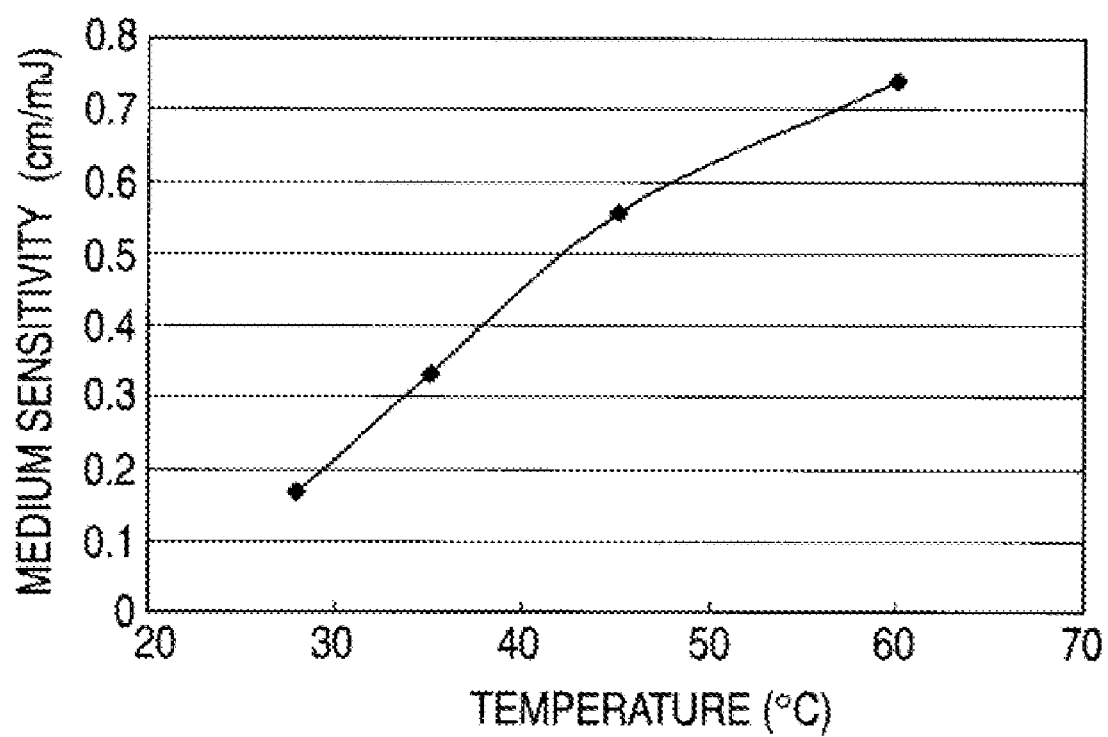
FIG. 9 is a diagram having temperatures on the horizontal axis and medium sensitivities on the vertical axis.

FIG. 9 shows the same result as that shown in FIG. 8 with temperatures on the horizontal axis and medium sensitivities on the vertical axis. As shown in FIG. 9, the medium sensitivities differ by several times at temperatures of 28° C. and 60° C. In other words, in a recording operation, the diffraction efficiencies completely differ in a case where recording is performed by using one same schedule when the temperatures of a hologram recording medium differ and diffracted light is obtained by irradiating reference light to the thus recorded holograms.

(Method for Compensating Influence to M/# by Temperature of Hologram Recording Medium (Upstream Processing))

As described above, a recording characteristic differs between a case where the upstream processing is performed and a case where the upstream processing is not performed. Performing the upstream processing improves the diffraction efficiency and is therefore desirable. Here, since the amount of optical energy necessary for the upstream processing differs according to the temperature of a hologram recording medium, a method for compensating the difference and performing the most desirable upstream processing will be described.

A necessary upstream processing time can be estimated to some extent if the necessary recording energy and the power of a light beam according to a recording temperature are known as shown in FIG. 7 are known. The upstream processing can be performed in a proper time in accordance with the temperature by sensing the temperature of a hologram recording medium or the place where the hologram recording medium is placed in recording and using the upstream processing time according to the temperature. If the upstream processing time is shorter than the proper time, no reconstruction light (diffracted light) does not occur from the hologram that is recorded first in time. If the upstream processing time is longer than the proper time, a hologram is formed to the extent that allows the occurrence of diffracted light. Then, since M/# is consumed, the number of recordable multiplexing stages is reduced.

The time necessary for the upstream processing as described above depends on not only the temperature but also the characteristic of a hologram recording medium. For this reason, the medium sensitivity shown in FIG. 9 is desirably recorded on a hologram recording medium in advance, and the upstream processing is desirably performed based on the information. The information on the medium sensitivity may be recorded as header information in a predetermined area of a hologram recording medium. Alternatively, since the medium sensitivity is a function of time as expressed by EQ2, the medium sensitivity may be not only directly recorded but also recorded in a table form including necessary times for the upstream processing, as header information. The header information may be recorded as a hologram in the innermost part of a hologram recording medium, for example, by a manufacturer of the hologram recording medium after the hologram recording medium is manufactured. Alternatively, the hologram recording/reconstructing apparatus side may have the information on medium sensitivity if the manufacturers of hologram recording media are limited. The upstream processing may include irradiating a light beam to a recording layer of a hologram recording medium, and it may be efficient to irradiate a light beam to a recording layer with the signal light spatial light modulating section 46 and reference light spatial light modulating section 47 in a white part.

Then, the hologram recording apparatus can exhibit a good recording characteristic by loading the header information, for example, and performing the upstream processing before a hologram is recorded on the hologram recording medium and then recording a hologram. More specifically, after the energization of a hologram recording apparatus, the header information may be loaded first, and the header information may be stored in a memory of the hologram recording apparatus. Then, a predetermined form of recording (recording scheduling) at a proper temperature according to the temperature in recording may be loaded, and a hologram may be recorded by following the recording schedule. The recording scheduling will be described in detail below.

(Method for Compensating Influence to M/# by Temperature of Hologram Recording Medium)

Figure 10:
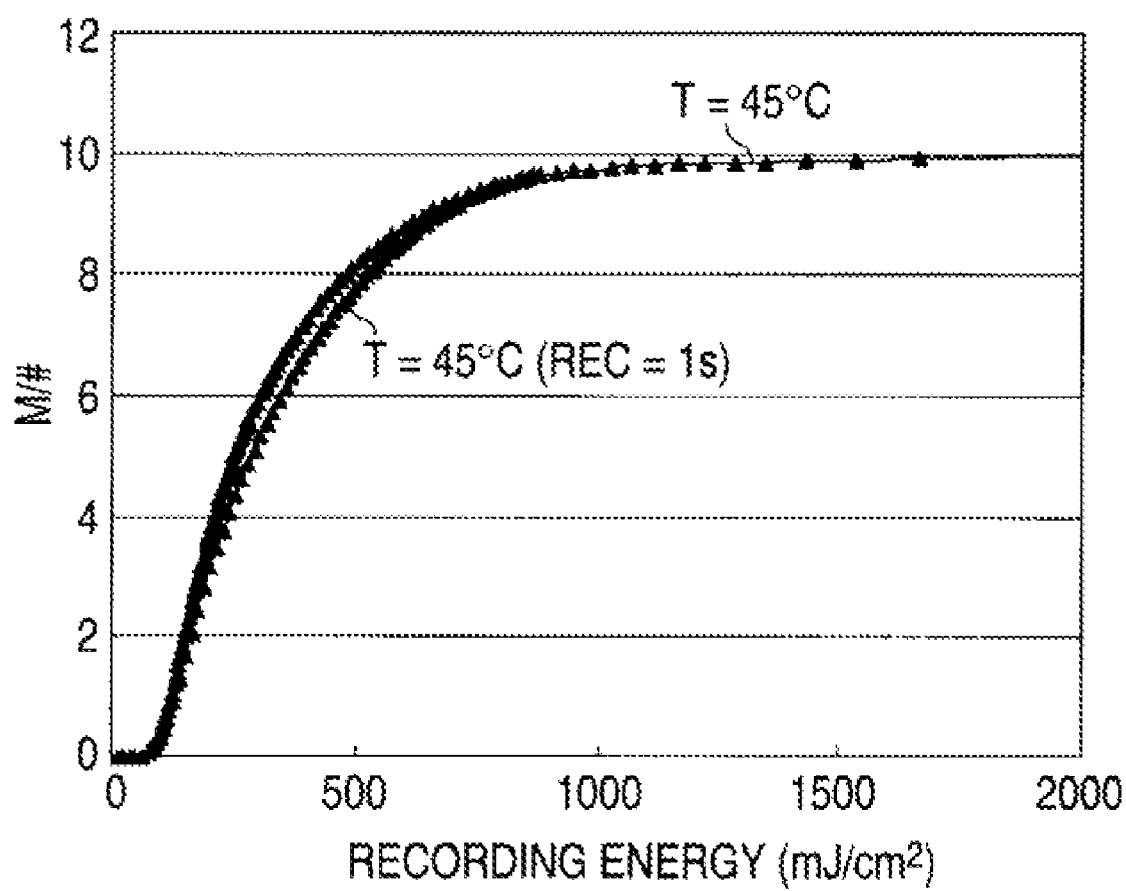
FIG. 10 is a diagram showing M/# to recording energy when 100 multiplexing stages are performed by using different schedules at a recording temperature of 45° C.

FIG. 10 shows M/# to recording energy when multiplexing is performed 100 times by using different schedules at a recording temperature of 45° C. The graph with "T=45° C." shows M/# to recording energy in a case where recording is performed by using scheduling allowing a constant diffraction efficiency from holograms resulting from 100 multiplexing stages. The graph with "T=45° C. (Rec=1s)" shows M/# to recording energy in a case where recording is performed with 100 multiplexing stages each in a recording time equal to one second. As shown in the graphs, the M/#s finally obtained to a cumulative amount of recording energy are substantially equal even with different recording schedules.

On the other hand, the M/# to a cumulative amount of recording energy differs according to the temperature of a hologram recording medium as shown in FIG. 8. Therefore, by graphing M/# to recording energy at temperatures in advance, the M/#s to cumulative amounts of energy as shown in the graph may be equal at the same temperatures even by using any schedules after that, and the diffraction efficiency characteristics from holograms in recording may be equal after all.

The steps of scheduling may include:

Step 1: calculating a maximum consumable M/#, which will be described later, from a desired diffraction efficiency;

Step 2: calculating a consumption of M/# per one recording stage by dividing the maximum consumable M/# by the number of the multiplexing stages; and Step 3: estimating a time schedule for one recording stage from the calculated consumption.

The steps from Step 1 to Step 3 (steps of scheduling) will be described with reference to FIGS. 11 to 14.

Figure 11:
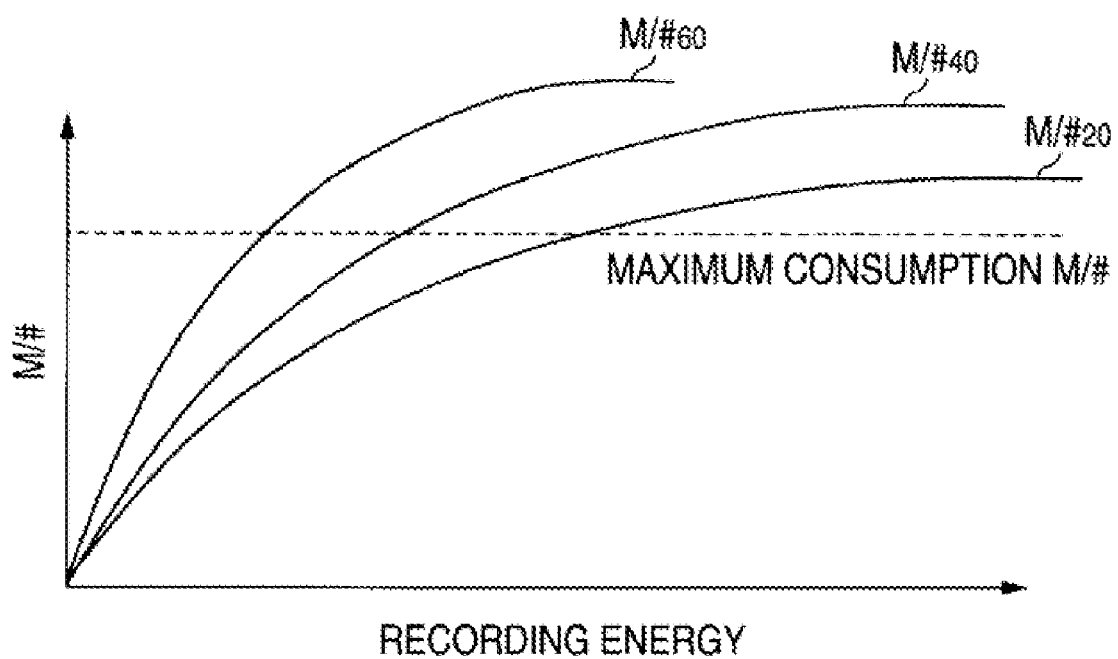
FIG. 11 is a diagram showing M/# to recording energy at different temperatures.

FIG. 11 shows M/# to recording energy at different temperatures. The horizontal axis indicates recording energy, and the vertical axis indicates M/#. The graphs with "M#$_{60}$", "M#$_{40}$" and "M#$_{20}$" show characteristics where the temperatures of a hologram recording medium are 60° C., 40° C. and 20° C., respectively. A maximum consumable M/# is calculated from the graph shown in FIG. 11 (Step 1). Elaborating on the estimation of the maximum consumable M/#, the maximum consumable M/# (indicated by the broken line in FIG. 11) may be necessarily lower than the maximum M/# in an assumed temperature range since the value of the actually consumable M/# differs according to the temperature as shown in FIG. 8. In other words, the maximum consumable M/# is a value of M/# allowing M/# equal to or higher than the maximum consumable M/# in any cases in a situation where a predetermined number of multiplexing stages are performed with a predetermined diffraction efficiency in an acceptable temperature range. If a lower maximum consumable M/# is defined, the number of multiplexing stages decreases, which decreases the storage capacity, though problems do not occur in reconstructing. On the other hand, if a higher maximum consumable M/# is defined, a problem of a reconstruction error may possibly occur in a reconstructing operation though the storage capacity increases.

Figure 12:
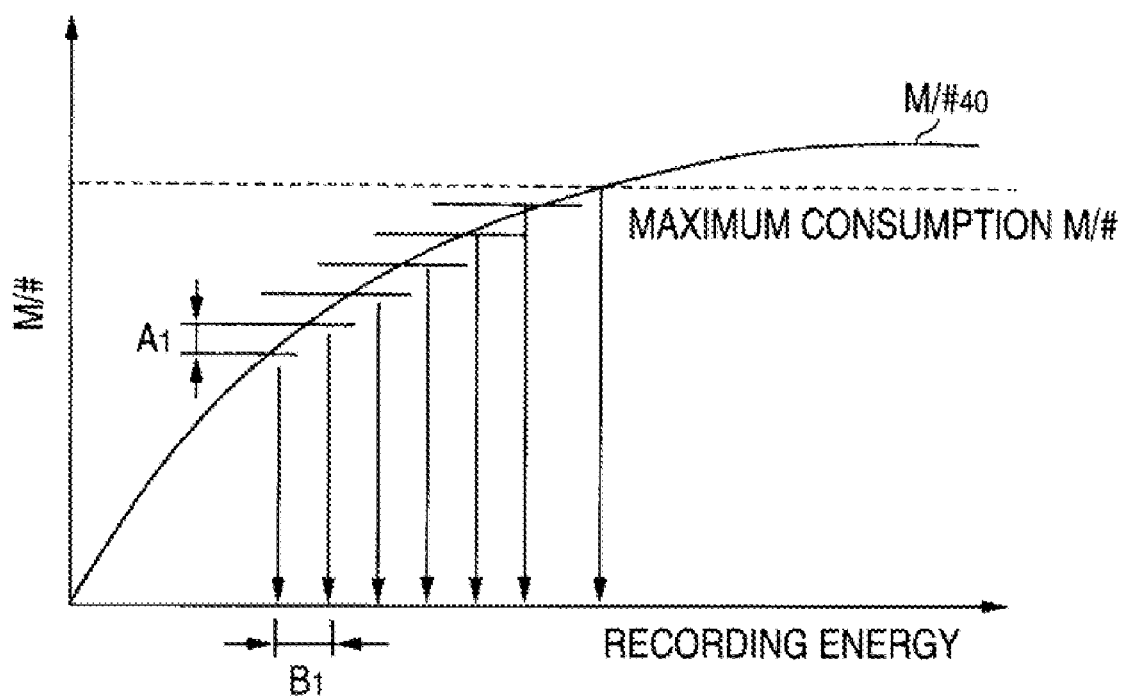
FIG. 12 is a diagram for describing processes of scheduling.

FIG. 12 is a diagram showing processes in Step 2 and Step 3. A consumption of M/# per one recording stage (indicated by the sign $A_1$ in FIG. 12) is calculated by dividing the maximum consumable M/# (indicated by the broken line in FIG. 12) at a temperature of 40° C., for example, by a predetermined number of multiplexing stages (Step 2). The number of multiplexing stages can be calculated from a diffraction efficiency, and the diffraction efficiency is defined to be sufficient for the reconstruction of record data. From the consumption of M/# per one recording stage calculated in Step 2, the amount of recording energy per one recording stage (indicated by the sign $B_1$ in FIG. 12) is calculated (Step 3). This operation is performed by reading the consumption of M/# per one recording stage from the value on the vertical axis in FIG. 12 and reading the corresponding value of the amount of recording energy per one recording stage from the horizontal axis in FIG. 12. In the same manner, also at temperatures excluding a temperature of 40° C., the consumption of M/# per one recording stage can be read from the value on the vertical axis in FIG. 12, and the corresponding value of the amount of recording energy can be read from the horizontal axis in FIG. 12.

Figure 13:
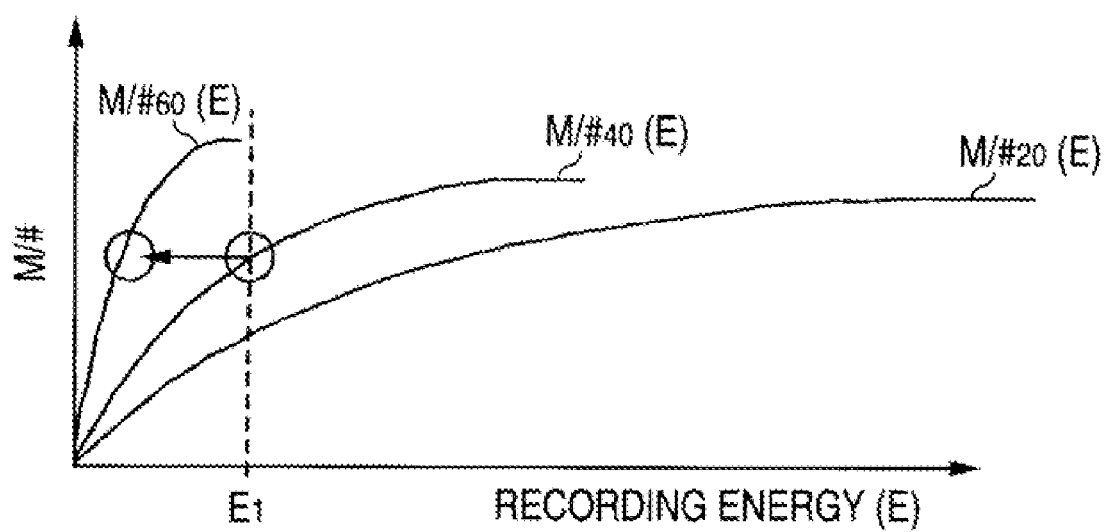
FIG. 13 is a diagram for describing processes of scheduling.

Next, a situation with a temperature change during a recording operation will be described with reference to FIGS. 13 and 14. As shown in FIG. 13, a situation is assumed in which recording is performed until the cumulative amount of recording energy reaches an amount of recording energy E1 where the temperature of a hologram recording medium is 40° C. and then the temperature of the hologram recording medium is changed to 60° C. It is assumed that the consumption of M/# is equal to a consumption M/#$_{40}$ (E1) where the temperature of the hologram recording medium is 40° C. The value En is calculated where the consumption of M/# at a temperature of 60° C. is equal to the consumption M/#$_{60}$(En) shown in FIG. 14. Then, the value $\Delta E$ of the amount of recording energy per one recording stage to the value of the consumption of M/# per one recording stage (indicated by the sign $A_2$) is read (indicated by the sign $B_2$). The value of the consumption M/# per one recording stage, which is indicated by the sign $A_2$, is predetermined so as to obtain a sufficient diffraction efficiency from recording at a given recording temperature of 60° C.

In this way, recording that provides a sufficient diffraction efficiency is allowed, keeping the number of multiplexing stages, in an acceptable temperature range, by keeping recording by assuming that the diffraction efficiency according to the value of the consumption of M/# per one recording stage, which is indicated by the sign $A_1$, is equal to the diffraction efficiency according to the value of the consumption of M/# per one recording stage, which is indicated by the sign $A_2$ when the temperature changes, for example. More generally, the value of the amount of recording energy per one recording stage, which provides a desired diffraction efficiency, may be calculated by:

$$\eta_T = (dM/\#_T(E)/dE)^2 \quad (EQ3)$$

to obtain an arbitrary diffraction efficiency every time the temperature changes. Alternatively, the values of the amount of recording energy per one recording stage, which provides a desired diffraction efficiency, may be saved in a table form from the beginning as a header information of a hologram recording medium or information in a memory provided in a control section of a hologram recording apparatus, without the calculation.

In order to keep the diffraction efficiency constant at different temperatures T, the value of the consumption of M/# per one recording stage is calculated so as to satisfy the relationship:

$$\eta_{T1} = \eta_{T2} = \ldots = \eta_{Tn} \quad (EQ4)$$

Figure 14:
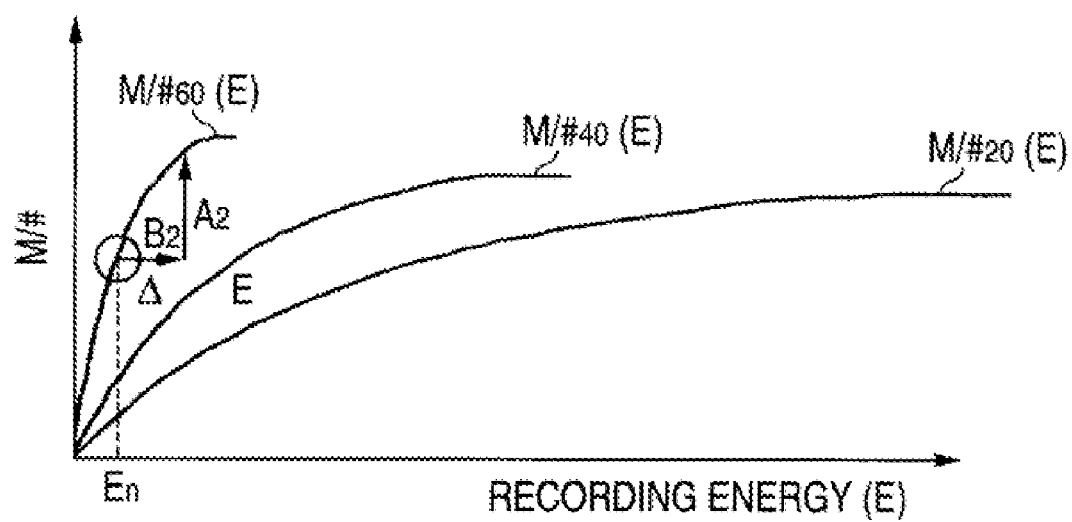
FIG. 14 is a diagram for describing processes of scheduling.

FIG. 14 is a diagram showing the concepts expressed by EQ3 and EQ4. Here, as shown by the graphs at different temperatures in FIG. 14, since the value of M/# is a nonlinear function that varies according to the temperature of a hologram recording medium and the amount of recording energy E, EQ3 is therefore the differentiation of the nonlinear function. As a result, the value $\Delta E$ varies according to the temperature of a hologram recording medium and the amount of recording energy E. For example, as shown in FIG. 14, as the number of multiplexing stages increases, the differentiation coefficient decreases as expressed by EQ3. If a recording method for a constant diffraction efficiency is adopted, the value $\Delta E$ increases as the number of multiplexing stages increases. Without depending on the temperature of a hologram recording medium for a constant diffraction efficiency based on EQ4, the value $\Delta E$ decreases as the temperature of a hologram recording medium increases.

In other words, according to this embodiment, the evaluation criterion for scheduling is that the diffraction efficiency in reconstructing is a constant value on each multiplexed hologram if the hologram is reconstructed at the same temperature as that of recording. The optimum scheduling according to this embodiment includes a series of processes to be performed for recording on a hologram recording medium by using recording energy allowing a constant diffraction efficiency. According to this embodiment, the optimum scheduling may include, for example, a process regarding how the irradiation time is defined with a constant value of light laser power if the irradiation time is to be controlled according to the temperature of a hologram recording medium in an operation of adjusting recording energy for obtaining a constant diffraction efficiency. The scheduling is an example, and the concept of "optimum" is also an example. In another example of the scheduling, the time for irradiating a light beam may be constant independent of the temperature. In another example of the concept of "optimum", scheduling may be performed so as to obtain a constant diffraction efficiency at a predetermined constant temperature (such as a temperature of 25° C.).

Figure 15:
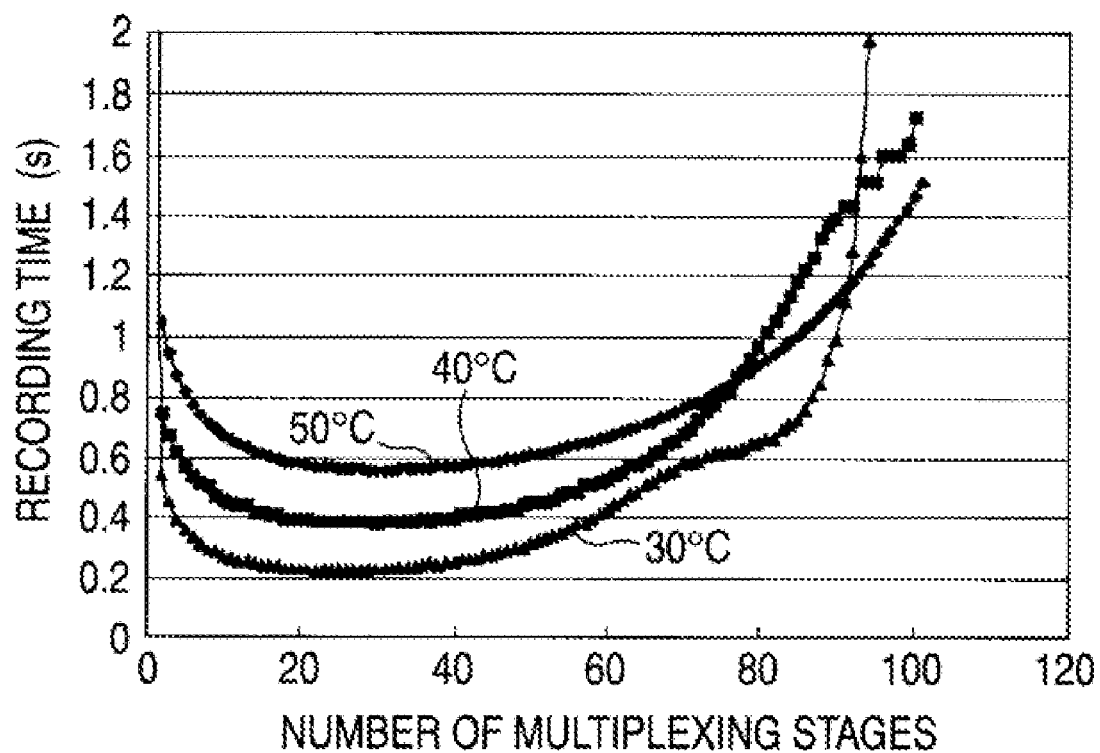
FIG. 15 is a diagram showing relationships between recording time with multiplexing and the number of multiplexing stages.

FIG. 15 shows a relationship between recording times of 100 multiplexing stages and the numbers of multiplexing stages in cases where the temperatures of a hologram recording medium in recording are 30° C., 40° C. and 50° C. in the manner as described above. The recording time at a temperature of 50° C. is about ⅓ on average of the recording time at a temperature of 30° C. In other words, FIG. 15 shows that, at a temperature of 50° C., a hologram having a good diffraction efficiency can be recorded on a hologram recording medium with a smaller amount of recording energy, that is, in a shorter time.

Figure 16:
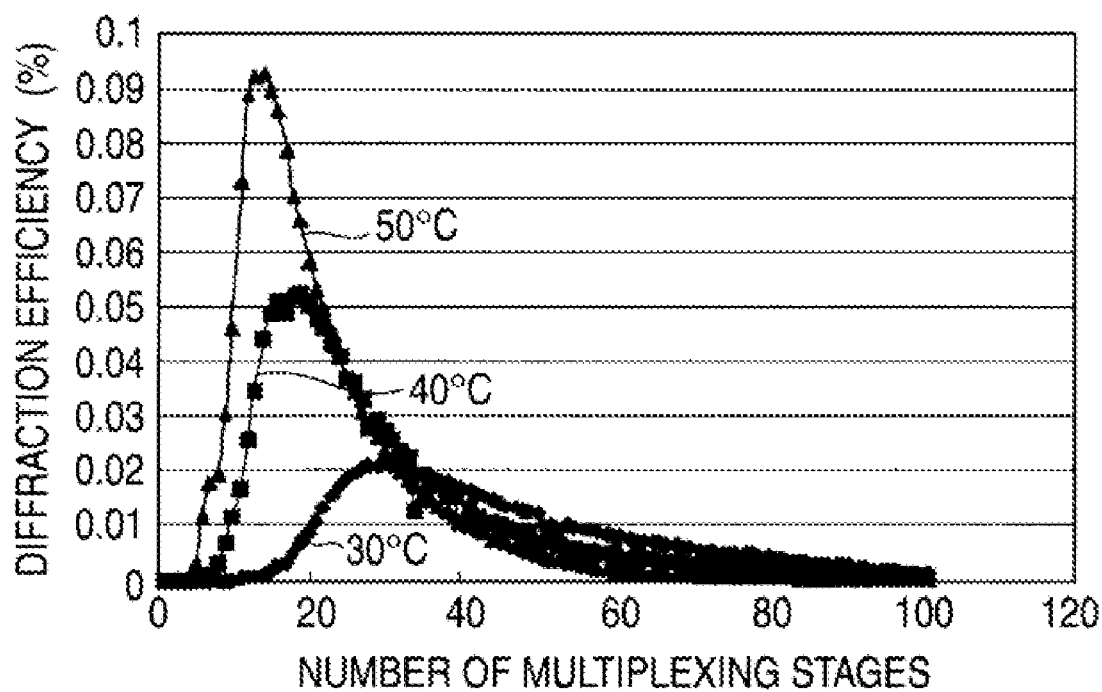
FIG. 16 is a diagram showing diffraction efficiencies at different stages in a case where multiplexing is performed with constant recording energy.

FIG. 16 shows the diffraction efficiency of each stage of 100 multiplexing stages with a constant amount of recording energy per one recording stage for forming a hologram in cases where the temperatures of a hologram recording medium are 30° C., 40° C. and 50° C. In other words, in order to obtain a constant value $\Delta E$ of the recording energy for forming a hologram, the time for irradiating a light beam is made as constant as one second in all of 100 stages.

Figure 17:
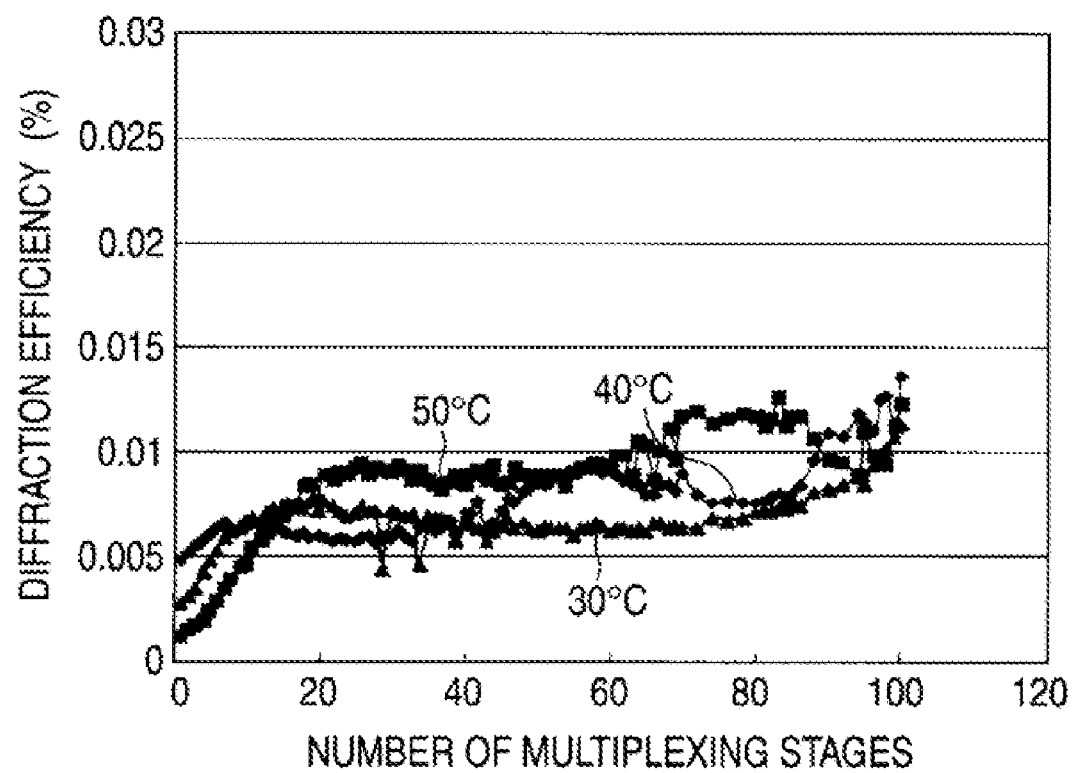
FIG. 17 is a diagram showing diffraction efficiencies at different stages in a case where multiplexing is performed with scheduling according to an embodiment.

FIG. 17 shows the diffraction efficiency of each stage of 100 multiplexing stages with various amounts of recording energy per one recording stage for forming a hologram in cases where the temperatures of a hologram recording medium are 30° C., 40° C. and 50° C. Here, the value $\Delta E$ of recording energy for forming each hologram is changed so as to have a constant diffraction efficiency $\eta_T$ in EQ3. Also, in order to change the magnitude of the value $\Delta E$, the time for irradiating a light beam is adjusted with a constant amount of the power of the light beam. Notably, the same result as that in FIG. 17 can be obtained not only by changing the time for irradiating a light beam according to the number of multiplexing stages but also by changing the amount of the power of the light beam according to the number of multiplexing stages.

Clearly, comparing between FIGS. 16 and 17, the diffraction efficiency varies according to the recording temperature if the scheduling is not used at all while the variation is reduced by using the scheduling.

How the scheduling is implemented in a hologram recording apparatus adopting the coaxial optical system shown in the conceptual diagram in FIG. 1 will be described.

Figure 18:
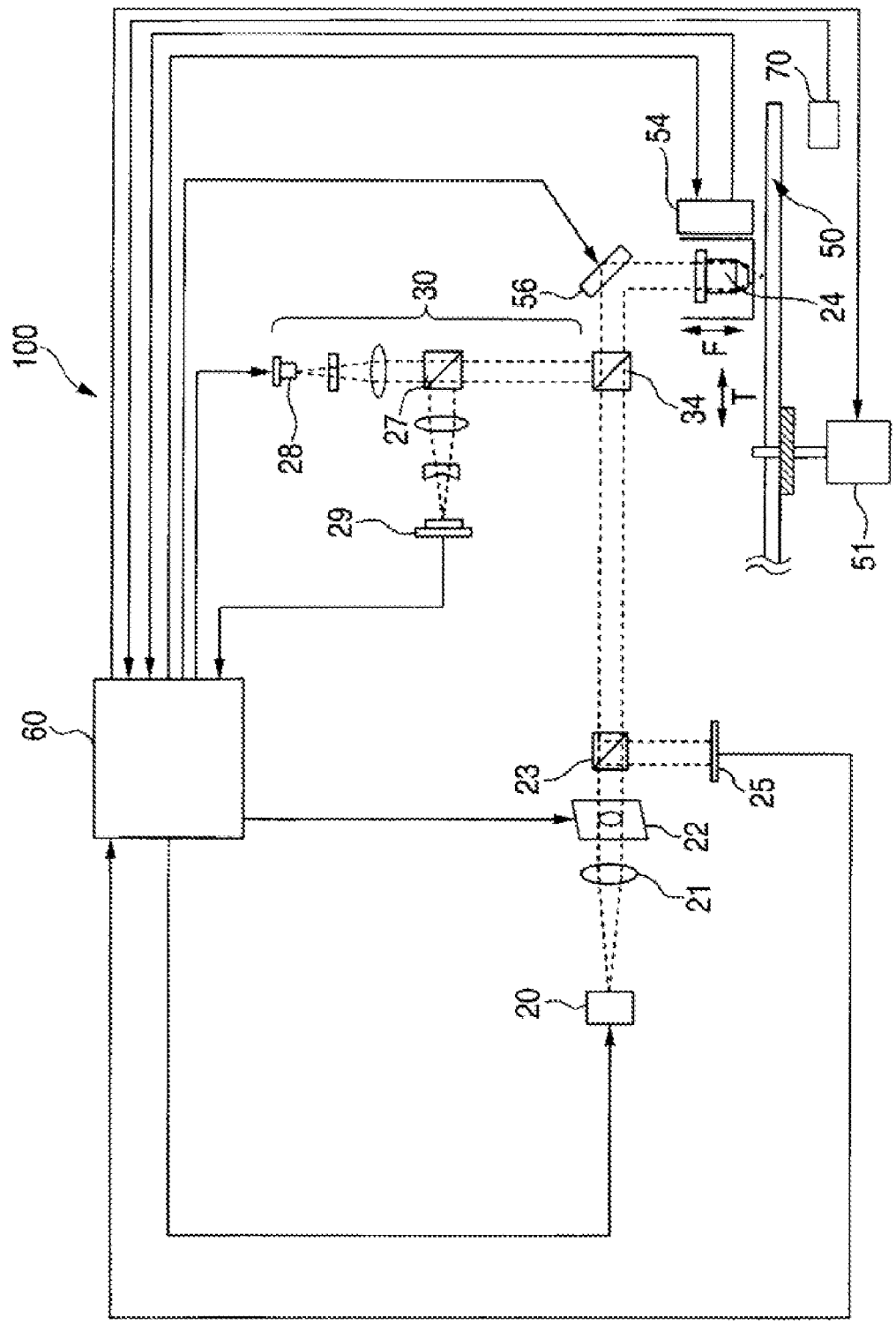
FIG. 18 is a schematic diagram of a hologram recording/reconstructing apparatus according to an embodiment of the application and centrally shows an optical section.

FIG. 18 is a schematic diagram of the hologram recording/reconstructing apparatus 100 according to this embodiment centrally showing the optical section according to an embodiment of a hologram recording apparatus. The same reference numerals are given to the same parts as those referred in the description above, and the descriptions thereon will be omitted here. Notably, the main part of this embodiment is a component relating to recording by the hologram recording/reconstructing apparatus 100, and describing it as a hologram recording apparatus is enough. However, for easy understanding of operations of the hologram recording apparatus, the part relating to reconstruction will be also described below. In the hologram recording/reconstructing apparatus 100, the part relating to the reconstructing function, such as the image sensor 25, may be excluded, and the hologram recording apparatus of this embodiment may be provided as an apparatus without a reconstructing function.

An optical system 30 for servo-controlling is deployed in the hologram recording/reconstructing apparatus 100. Brief description will be given by giving reference numerals to main optical parts included in the optical system 30 for servo-controlling. A light source 28 for servo-controlling emits a light beam for servo-controlling. The light beam for servo-controlling has a different wavelength from the wavelength of the light beam from the laser light source 20 for recording/reconstructing. Thus, the light beam for servo-controlling and the light beam for recording/reconstructing can be separated since the light beam for servo-controlling is a light beam having a long wavelength (such as a light beam from red laser). Furthermore, since the photopolymer does not react with a red light beam, the recording layer 50a (refer to FIG. 4) is not influenced by the red light beam.

A beam splitter 27 is for guiding return light from the hologram recording medium 50 to the photodetector 29 and the photodetector 29 has a configuration in which a detector is divided into multiple sections so as to deal with astigmatism for focus servo (positional control in the direction indicated by the sign F in FIG. 18) and push-pull method for radial (tracking) servo (positional control in the direction indicated by the sign T in FIG. 18), for example. A dichroic mirror 34 is an optical part common to the optical system 30 for servo controlling and an optical system for recording/reconstructing and is a wavelength separating element that separates a light beam for servo controlling and a light beam for recording/reconstructing. A reflex mirror 56 changes the direction of travel of a light beam for servo-controlling and a light beam for recording/reconstructing and guides them to the objective lens 24 and changes the direction of travel of each diffracted light from the address groove 50c (refer to FIG. 5) of the hologram recording 50 and a hologram and guides them to the optical system 30 for servo-controlling and the optical system for recording/reconstructing. The reflex mirror 56 also functions as a mechanism section for performing angle multiplexing as described above.

A spindle motor 51 rotates the hologram recording medium 50 having a similar external form to that of an optical disk such as a CD and a DVD in the past about the geometric center of the disk form of the hologram recording medium 50. The rotational position of the hologram recording medium 50 is controlled by a control signal from a control section 60. A temperature sensor 70 is placed in contact with or near the hologram recording medium 50 so as to lower the heat transfer rate and senses the temperature of the hologram recording medium 50 and notifies the sensed temperature to the control section 60.

An operation for recording by the hologram recording/reconstructing apparatus 100 will be described as steps to be sequentially performed by the control section 60.

(Recording Preparation Step)

The temperature of the hologram recording medium 50 is sensed. The servo-control is performed by using the optical system 30 for servo-controlling, and the information on the medium sensitivity recorded at the innermost circumferential header of a hologram recording medium is read by using a red light beam for servo-controlling, and the value of the consumption M/#, which is a cumulative consumption M/# recorded at the header, is read (or the information stored in the control section 60 of the hologram recording apparatus may be used). Then, the amount of recording energy (for writing one page) per one recording stage for a predetermined diffraction efficiency in a reconstructing operation is calculated from the medium sensitivity, consumption M/# and current temperature, and the time for irradiating a blue light beam is calculated.

A red beam for servo-controlling is positioned in an area to be written by using the optical system 30 for servo-controlling. The angle of the reflex mirror predetermined. Thus, also when a blue beam is emitted, the position of the blue beam is properly placed at a recording position.

The spatial light modulator 22 is controlled. In other words, in order to perform a recording operation on the hologram recording medium 50, a signal light pattern for causing signal light is displayed on the signal light spatial light modulating section 46 and a reference light pattern for causing reference light is caused on the reference light spatial light modulating section 47, based on the record data.

Through the steps above, the preparation for writing record data on the hologram recording medium 50 is completed.

(Recording Step)

The laser light source 20 is caused to output light. The time causing the laser light source 20 to output light is equal to the time for irradiating a blue light beam, which is calculated in the step above.

As a result, each of the signal light and reference light passes through the beam splitter 23 and dichroic mirror 34 and is reflected by the reflex mirror 56. Then, the beam size is reduced by the objective lens 24 to the beam size suitable for recording/reconstructing, and each of the signal light and reference light is irradiated to the hologram recording medium 50. The signal light and reference light overlap in the recording layer 50a of the hologram recording medium 50, and a hologram is formed, whereby the record data is recorded.

The preparation step and recording step may be repeated alternately to record. Here, the combination of the preparation step and recording step may be performed for each operation of recording one page. Alternatively, instead of each operation of recording one page, multiple pages may be serially recorded after the preparation step. For example, the combination may be performed for each predetermined section of record data or for each predetermined period of time. Alternatively, the preparation step may be performed when the amount of change in temperature, which is sensed by the temperature sensor 70, exceeds a predetermined amount.

The header area, which is a predetermined area of a hologram recording medium, may be a writable area such as an area where data is recordable as a hologram, and a cumulatively increasing consumption M/# may be sequentially written therein. Then, data may be written within the range below the maximum consumable M/# by checking the consumption M/# before performing the writing operation. Alternatively, the same effect can be obtained by storing the consumption M/# in a random access memory (RAM) deployed in the control section as described above, without recording the consumption M/# on a hologram recording medium.

In the method for controlling the recording energy for a constant diffraction efficiency, instead of the control of the irradiation time of a light beam from the laser light source 20 or the intensity of a light beam from the laser light source 20, a shutter may be placed at some position in an optical path and the irradiation times of light beams (including signal light and reference light) may be adjusted by opening or closing the shutter. Alternatively, the recording light power (the intensity of either reference light or signal light or the intensity of both reference light and signal light) may be adjusted by a wave plate and a polarized beam splitter (PBS).

In the manner as described above, a recording operation can be performed that causes the diffraction efficiency to have a predetermined value in a reconstructing operation even in a case where the temperatures of the hologram recording medium differ. When the temperature changes during a recording operation, the recording operation can be performed so as to cause the diffraction efficiency to have a predetermined value.

The subject matter of the present application should not be limited to the description described herein. For example, having described the coaxial method in which signal light and reference light are placed coaxially, the application can be implemented based on the same technical idea also in a double beam method in which signal light and reference light are input to a hologram recording medium through different optical parts. Furthermore, the present application can be implemented with either transmissive or reflective spatial light modulator.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A hologram recording apparatus that records a hologram on a recording layer of a hologram recording medium by causing interference between signal light modulated in accordance with record data and reference light from the same light source as that of the signal light, the hologram recording apparatus comprising:
    a signal light spatial light modulating section that displays a signal light pattern for causing the signal light;
    a reference light spatial light modulating section that displays a reference light pattern for causing the reference light;
    a control section that controls:
        (a) a first form of the signal light pattern to be displayed on the signal light spatial light modulating section;
        (b) a second form of the reference light pattern to be displayed on the reference light spatial light modulating section; and
        (c) optical energy of the signal light and reference light; and
    a temperature sensor that senses a temperature of the hologram recording medium,
    wherein the control section irradiates a predefined amount of optical energy to the hologram recording medium in accordance with the temperature of the hologram recording medium at the time of recording such that a diffraction efficiency of diffracted light caused by irradiation of the reference light to the hologram after recording can be equal to a predetermined value.

2. The hologram recording apparatus according to claim 1, wherein the diffraction efficiency is caused to have a constant value.

3. The hologram recording apparatus according to claim 1, wherein the optical energy is controlled by changing the time for outputting the signal light and reference light.

4. The hologram recording apparatus according to claim 1, wherein the optical energy is controlled by changing the light intensity/intensities of the signal light and/or reference light.

5. The hologram recording apparatus according to claim 1, wherein:
    multiple holograms are formed by sharing a same area of the recording layer; and
    the control section controls to record an amount of consumption, M-number, representing the amount of holograms formed on the same area in a storage area of the hologram recording medium or a storage area of the control section.

6. The hologram recording apparatus according to claim 1, wherein the time for upstream processing, which is processing in a stage before recording, is changed in accordance with the temperature of the hologram recording medium.

7. A hologram recording medium comprising:
    a recording layer on which a hologram is recorded by causing interference between signal light modulated in accordance with record data and reference light from the same light source as that of the signal light,
    wherein information on recording energy for obtaining a diffraction efficiency equal to a predetermined value to the temperature of the hologram recording medium at the time of recording the hologram, is recorded in a predetermined area in advance.

8. The hologram recording medium according to claim 7, wherein the information on recording energy is recorded as the time for outputting the signal light and reference light in a case where the intensities of the signal light and reference light to be used for recording are specified.

9. A method of recording holograms on a recording layer of a hologram recording medium by causing interference between signal light modulated in accordance with record data and reference light from the same light source as that of the signal light, the method comprising:
    sensing a temperature of the hologram recording medium; and
    irradiating a predefined amount of optical energy to the hologram recording medium in accordance with the temperature of the hologram recording medium at the time of recording such that a diffraction efficiency of diffracted light caused by the irradiation of the reference light to the hologram after recording can be equal to a predetermined value.

* * * * *